(12) United States Patent
Cole

(10) Patent No.: US 8,798,617 B1
(45) Date of Patent: Aug. 5, 2014

(54) DEVICE ENABLED PEER-TO-PEER LOCATION BASED ROUTING TO CELLULAR NETWORK USING AN UNLICENSED RADIO SPECTRUM FOR DELIVERY OF DISCOVERY MESSAGES

(71) Applicant: Sprint Communications Company L.P., Overland Park, KS (US)

(72) Inventor: Joshua R. Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 7 days.

(21) Appl. No.: 13/656,469

(22) Filed: Oct. 19, 2012

(51) Int. Cl.
H04W 76/02 (2009.01)

(52) U.S. Cl.
USPC .................. 455/426.1; 455/401.1; 455/404.2; 455/466

(58) Field of Classification Search
USPC .......................... 455/426.1, 401.1, 404.2, 466
See application file for complete search history.

(56) References Cited

U.S. PATENT DOCUMENTS

| | | | |
|---|---|---|---|
| 7,254,400 B1 * | 8/2007 | Sakakura | 455/456.1 |
| 2004/0147223 A1 * | 7/2004 | Cho | 455/41.2 |
| 2005/0094571 A1 * | 5/2005 | Lempio et al. | 370/252 |
| 2005/0180356 A1 * | 8/2005 | Gillies et al. | 370/329 |
| 2006/0062175 A1 * | 3/2006 | Ling et al. | 370/328 |
| 2006/0160540 A1 * | 7/2006 | Strutt et al. | 455/440 |
| 2006/0233184 A1 | 10/2006 | Stanforth | |
| 2008/0144566 A1 | 6/2008 | Duggi et al. | |
| 2008/0267147 A1 | 10/2008 | Niranjan et al. | |
| 2008/0270554 A1 | 10/2008 | Niranjan et al. | |
| 2009/0011763 A1 * | 1/2009 | Torres | 455/435.1 |
| 2009/0143051 A1 * | 6/2009 | Kim | 455/414.2 |
| 2010/0080197 A1 * | 4/2010 | Kanellakis et al. | 370/338 |
| 2010/0113075 A1 * | 5/2010 | Lee | 455/466 |
| 2010/0118874 A1 * | 5/2010 | Li | 370/389 |
| 2010/0172296 A1 | 7/2010 | Singh et al. | |
| 2010/0265895 A1 | 10/2010 | Bracha | |
| 2010/0265922 A1 | 10/2010 | Bracha | |
| 2010/0279647 A1 * | 11/2010 | Jacobs et al. | 455/404.1 |
| 2011/0063105 A1 * | 3/2011 | Bennett et al. | 340/539.11 |
| 2011/0164527 A1 * | 7/2011 | Mishra et al. | 370/252 |
| 2012/0100825 A1 * | 4/2012 | Sherman et al. | 455/404.2 |
| 2012/0120892 A1 * | 5/2012 | Freda et al. | 370/329 |
| 2012/0329473 A1 * | 12/2012 | Ekbatani | 455/456.1 |
| 2013/0017802 A1 * | 1/2013 | Adibi et al. | 455/404.1 |
| 2013/0029686 A1 * | 1/2013 | Moshfeghi | 455/456.1 |
| 2013/0059540 A1 * | 3/2013 | Anschutz et al. | 455/41.2 |

OTHER PUBLICATIONS

Wikipedia, Mobile ad hoc network (MANET), http://en.wikipedia.org/w/index.php?title=Mobile_ad_hoc_network&printable-yes, Jun. 10, 2012.

* cited by examiner

*Primary Examiner* — Jinsong Hu
*Assistant Examiner* — Jean Chang

(57) ABSTRACT

A mobile device for use in a peer-to-peer radio communication network coupled to a cellular radio communication network. The mobile device comprises a cellular radio transceiver, a short range radio transceiver configured for radio communication using unlicensed radio spectrum over short ranges, a non-transitory memory, a processor, and an application stored in the non-transitory memory. When executed by the processor, the application discovers a plurality of peer mobile devices based on communication with these peer mobile devices using the short range radio transceiver, identifies at least one base transceiver station to which at least one of the discovered peer mobile devices provides a peer-to-peer network link, and initiates a data link to a first base transceiver station via a first discovered peer mobile device in the peer-to-peer radio communication network based on a geographical route list.

14 Claims, 8 Drawing Sheets

US 8,798,617 B1

DEVICE ENABLED PEER-TO-PEER LOCATION BASED ROUTING TO CELLULAR NETWORK USING AN UNLICENSED RADIO SPECTRUM FOR DELIVERY OF DISCOVERY MESSAGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are used for conducting voice communication as well as data communication such as emails, short message service (SMS) messages, uploading and downloading content. The mobile communication devices typically establish a wireless communication link with a base transceiver station or cell tower, and the base transceiver station provides a wired link into the public switched telephone network and/or the Internet. Wireless communication service providers invest in building base transceiver stations to provide wireless links for subscribers. The location and number of base transceiver stations may be carefully determined to provide a desirable return on investment to the wireless communication service providers. Some areas of dense population have a large number of base transceiver stations; areas of low population density may have fewer base transceiver stations.

SUMMARY

In an embodiment, a mobile device for use in a peer-to-peer radio communication network coupled to a cellular radio communication network is disclosed. The mobile device comprises a cellular radio transceiver, a short range radio transceiver configured for radio communication using unlicensed radio spectrum over distances of at least 5 feet, wherein the short range radio transceiver is not capable of cellular radio communication, a non-transitory memory, a processor, and an application stored in the non-transitory memory. When executed by the processor, the application discovers a plurality of peer mobile devices based on communication with these peer mobile devices using the short range radio transceiver, wherein the discovery comprises receiving a geographical location of each of the plurality of peer mobile devices, and identifies at least one base transceiver station to which at least one of the discovered peer mobile devices provides a peer-to-peer network link. The application further analyzes the geographical locations of the plurality of peer mobile devices, based on the analysis of geographical locations of the plurality of mobile devices, determines a geographical route list, and initiates a data link to a first base transceiver station via a first discovered peer mobile device in the peer-to-peer radio communication network.

In an embodiment, a method of peer-to-peer radio communication by a mobile device is disclosed. The method comprises transmitting a discovery message via a short range radio transceiver of the mobile device using an unlicensed radio spectrum and receiving a plurality of discovery reply messages via the short range radio transceiver of the mobile device, wherein each discovery reply message is transmitted by a peer mobile device. The method further comprises determining, based on the discovery reply messages, a geographical location of a plurality of peer mobile devices, analyzing the geographical locations of the peer mobile devices, and based on analyzing the geographical locations, identifying a peer-to-peer communication link to a base transceiver station. The method further comprises establishing a communication session with the base transceiver station via the identified peer-to-peer communication link.

In another embodiment, a method of peer-to-peer radio communication by a mobile device is disclosed. The method comprises discovering by the mobile device a plurality of peer mobile devices using a short range radio transceiver of the mobile device configured for using an unlicensed radio spectrum and discovering by the mobile device a blind repeater using the short range radio transceiver of the mobile device, wherein the blind repeater does not comprise a cellular radio transceiver and wherein the blind repeater is statically located. The method further comprises receiving by the mobile device a connection request from a peer mobile device that is outside the radio coverage of a base transceiver station and based on the connection request, sending the connection request to the blind repeater, whereby the mobile device enables the peer mobile device that is outside the radio coverage of the base transceiver station to connect to the base transceiver station.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
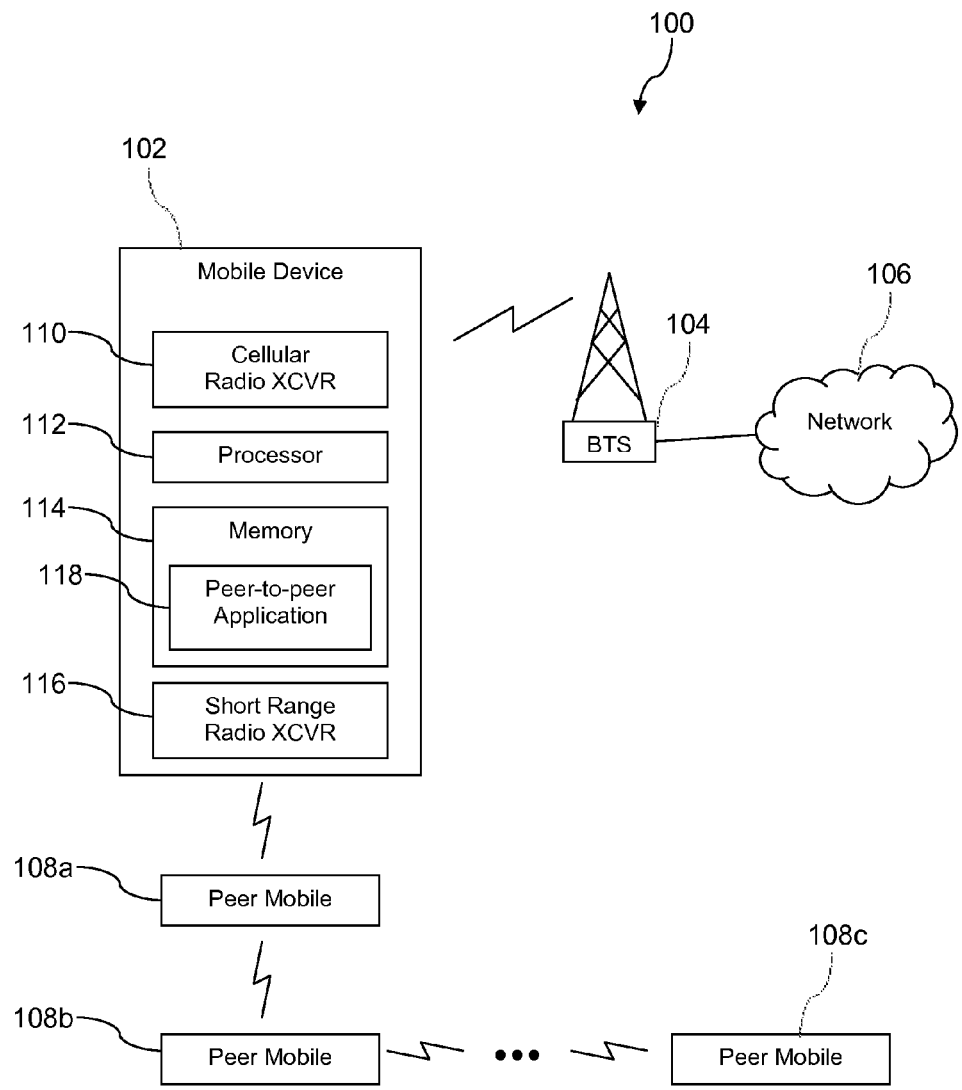
FIG. 1 is a block diagram of a peer-to-peer communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for peer-to-peer communication among mobile devices using short range radio transceivers is described. The mobile devices may dynamically establish a peer-to-peer network that changes and adapts over time as the mobile devices move. In some contexts, the peer-to-peer network may be referred to as a mesh network and/or a self-healing mesh network.

The peer-to-peer network couples to a base transceiver station via at least one of the mobile devices that is in coverage of the base transceiver station or that is in a communication session with the base transceiver station. By passing a communication message from one peer mobile device to another peer mobile device and ultimately to the mobile device with a communication session established with the base transceiver station, the message may be sent from a peer mobile device that does not have its own communication connection with the base transceiver station to the mobile device that does have a communication session established with the base transceiver station. In this way the message may be transmitted to a public or private network via the base transceiver station. Communications from the network via the base transceiver station via the mobile device having a communication session established with the base transceiver station and via the peer-to-peer network to the peer mobile device may also be supported. In an embodiment, the system may support any type of communication. In an embodiment, the system may support data communication, for example email data communication and/or content downloading and/or uploading communication. In an embodiment, the system may support short message type of communication, for example short message service (SMS) text messaging communication.

The short range radio transceivers may communicate on unlicensed radio spectrum. The contemplated peer-to-peer communication is a best effort communication system and makes no guarantees or promises as to quality of service. It may be economically infeasible to purchase licensed radio spectrum to deploy a best effort communication system. Additionally, the short range radio transceivers may operate in a radio frequency range of about 60 GHz, for example in some frequency band between 55 GHz and 65 GHz.

The peer mobile devices may transmit discovery messages that may be used to learn their nearest neighbors and otherwise to learn peer mobile devices that they are close enough to reliably communicate with using their short range radio transceivers. In some cases, the short range radio transceivers may be restricted to communications within about 150 feet. In other embodiments, the short range radio transceivers may be restricted to communications within about 1 mile. In an embodiment, the short range radio transceivers are not cellular radio transceivers and are not compatible with cellular radio air interfaces such as code division multiple access (CDMA) air interface, global system for mobile communication (GSM) air interface, long term evolution (LTE) air interface, worldwide interoperability for microwave access (WiMAX) air interface. The discovery messages may include an identity of the transmitting mobile device, a geographical location of the mobile device, a bandwidth or data throughput that the mobile device is able to provide in the peer-to-peer mode of operation, and a willingness to carry messages. The discovery messages may also include information about other peer mobile devices known to the transmitting mobile device. By sharing and analyzing such discovery messages, peer mobile devices can infer a location and network of peer mobile devices.

The peer mobile devices may send ping messages to other peer mobile devices that they have already discovered. The ping messages may be more succinct than discovery messages and may conserve peer-to-peer network bandwidth. The peer mobile devices may transmit the discovery messages less frequently when they are pinging to already identified peer mobile devices. Alternatively, the peer mobile devices may not transmit other discovery messages, beyond an initial discovery interval, unless they receive a discovery message from an unknown peer mobile device.

The mobile devices may analyze the discovery messages to determine one or more route lists. A route list may be a list of peer mobile devices that associate to a particular base transceiver station. For example, these peer mobile devices may be coupled to the base transceiver station or may be closer to a mobile device that is coupled to the base transceiver station than the subject mobile device itself. If the peer-to-peer network is coupled to a plurality of base transceiver stations, the mobile device may store a plurality of route lists, one route list associated with each base transceiver station. When the mobile device wants to send a message to a particular base transceiver station and/or to the private network or public network via the base transceiver station, whether the mobile device generates the message or is simply passing along the message on behalf of a peer mobile device, the mobile device sends the message based on a route list associated with the particular base transceiver station.

This kind of routing may be referred to in some contexts as geographical routing. The peer mobile devices may not use network layer routing protocols to route messages. For example the peer mobile devices may not use the Internet Protocol and/or the domain name system (DNS) for routing messages in the peer-to-peer network. One skilled in the art would appreciate that in the ephemeral and rapidly changing peer-to-peer network routing of messages using a network layer routing protocol may be infeasible. This kind of routing may be referred to as IP-less routing in some cases.

In an embodiment, one or more blind repeaters may be located in the peer-to-peer network. The blind repeaters may be stationary or statically located. The blind repeaters do not have cellular radio transceivers. The blind repeaters may have one or more short range radio transceivers, so that they may be able to handle a higher data throughput by conducting concurrent radio communications with mobile devices.

Turning now to FIG. 1, a system 100 is described. In an embodiment, the system 100 comprises a mobile device 102, a base transceiver station 104, and a network 106. The network 106 may comprise one or more public networks, one or more private networks, or a combination thereof. The base transceiver station 104 provides a wireless communication link to the mobile device 102 and couples the mobile device 102 to the network 106. The mobile device 102 is able to complete voice calls and data calls via the base transceiver station 104 and the network 106. For example the mobile device 102 may access content from a content server coupled to the network 106. The mobile device 102 may be able to send and receive emails and/or simple message service (SMS) text messages from the network 106. The base transceiver station 104 may also be referred to as a cell site and/or a cell tower. The base transceiver station 104 may provide a wireless link to the mobile device 102 according to one or more of a code division multiple access (CDMA) wireless protocol, a global system for mobile communication (GSM)

wireless protocol, a long term evolution (LTE) wireless protocol, a worldwide interoperability for microwave access (WiMAX) wireless protocol, and/or other wireless protocols. The mobile device 102 may be a mobile phone, a personal digital assistant (PDA), a media player, or other mobile communication device.

The mobile device 102 may comprise a cellular radio transceiver 110, a processor 112, a memory 114, and a short range radio transceiver 116. The memory 114 may store a peer-to-peer communication application 118 that may be executed by the processor 112 to promote peer-to-peer communications. The short range radio transceiver 116 may be configured to communicate on unlicensed radio spectrum. The peer-to-peer communications promoted by the mobile devices 102, 108 may provide a communication solution for less than idea communication circumstances, which may be referred to as a best effort solution or a best effort system. The peer-to-peer communications may not be guaranteed or associated with a service level agreement (SLA). In this context, a wireless service provider may not judge purchasing licensed radio spectrum for supporting a best effort communication system to be economically feasible.

The short range radio transceiver 116 may be limited to transmitting at a low power signal level to avoid interfering with other radio devices. The short range radio transceiver 116 may transmit and receive at a frequency of about 60 GHz. For example, in an embodiment, the short range radio transceiver 116 may transmit and receive in a frequency range from about 59.5 GHz to about 60.5 GHz. Alternatively, in an embodiment, the short range radio transceiver 116 may transmit and receive in a frequency range from about 57 GHz to about 63 GHz. Alternatively, in an embodiment the short range radio transceiver 116 may transmit and receive in a frequency range from about 55 GHz to about 65 GHz. In another embodiment, however, the short range radio transceiver 116 may transmit and receive in a different frequency range. The short range radio transceiver 116 may be configured to communicate over distances up to about 1 mile. Alternatively, the short range radio transceiver 116 may be configured to communicate over distances up to about 1000 feet. Alternatively, the short range radio transceiver 116 may be configured to communicate over distances up to about 300 feet. Alternatively, the short range radio transceiver 116 may be configured to communicate over distances up to about 150 feet. In an embodiment, the short range radio transceiver 116 is not a cellular radio transceiver and does not establish wireless communication links using cellular radio air interfaces such as a code division multiple access air interface, a global system for mobile communication air interface, a long term evolution air interface, or a worldwide interoperability for microwave access air interface.

The system 100 may comprise a plurality of peer mobile devices 108, for example a first peer mobile device 108a, a second peer mobile device 108b, and a third peer mobile device 108c. The peer mobile devices 108 may be substantially similar to the mobile device 102. As illustrated in FIG. 1, the peer mobile devices 108 may have a cellular radio transceiver 110 but are not in communication with the base transceiver station 104. One or more of the peer mobile devices 108 may be too far from the base transceiver station 104 to initiate a wireless link. One or more of the peer mobile devices 108 may be within coverage of the base transceiver station 104, but the base transceiver station 104 may not have any available communication channels to allocate to the subject peer mobile device 108. One or more of the peer mobile devices 108 may not have a wireless communication service that is supported by the base transceiver station 104.

The peer mobile devices 108 and the mobile device 102 may discover each other by sending out discovery messages using their respective short range radio transceivers 116. It is understood that under some circumstances one or more mobile devices 102, 108 may not send out or process received discovery messages, for example when the subject mobile device 102, 108 does not wish to participate in a peer-to-peer communication network. The discovery messages may comprise information that identifies the mobile device 102, 108 that transmits the discovery message and its geographical location. The discovery messages may comprise information about the communications data rate and/or bandwidth that the subject mobile device 102, 108 is able to provide for peer-to-peer communication based on using the short range radio transceiver 116. Some of the mobile devices 102, 108 may receive their geographical location from a global positioning system (GPS) receiver of the mobile device. Alternatively, some of the mobile devices 102, 108 may determine their geographical location by triangulation, for example based on neighboring mobile devices 102, 108 or based on triangulation of base transceiver stations 104.

The discovery message may further comprise information that identifies other mobile devices 102, 108 known to the mobile device 102, 108 that transmits the discovery message and the geographical location of those other mobile devices 102, 108. The discovery message may comprise information about up to 20 nearest neighbors of the subject mobile device 102, 108. Alternatively, the discovery message may comprise information about a different maximum number of nearest neighbors. It is understood, of course, that the discovery message may comprise less than the nominal maximum number of nearest neighbors when there are fewer peer mobile devices 108 in the peer-to-peer network or when there are fewer peer mobile devices 108 in communication with the subject mobile device 102, 108.

Under some circumstances, the discovery message may further comprise an indication that the mobile device 102 is in coverage of the base transceiver station 104 and is able to establish a wireless communication link with the transceiver station 104 that may be used by the peer mobile devices 108 to access the network 106. By analyzing and processing the information contained in the discovery messages that it receives, a mobile device 102, 108 can infer a geographical map of neighboring mobile devices 102, 108. The mobile devices 102, 108 may send ping messages out to mobile devices 102, 108 already discovered on a periodic basis or on an occasional basis. Ping messages may be used in lieu of discovery messages to reduce communication load in the peer-to-peer network. The mobile devices 102, 108 may both ping and send out less frequent discovery messages.

The peer mobile devices 108 and the mobile device 102 may establish a peer-to-peer network such that one of the peer mobiles 108 can send a communication message to the mobile device 102, and the mobile device 102 can send the communication message to the network 106 on behalf of the subject peer mobile 108. The peer-to-peer network may provide for a second mode of communication in difficult wireless communication environments, for example in an urban area having many large buildings creating radio dead zones or radio shadows or in rural areas with less dense population of base transceiver stations 104. The communication message may comprise a data message or a voice message. The communication message may comprise a short message service (SMS) text message, an email message, a Voice Over Internet Protocol (VoIP) call or message, or other messages. The communication messages transmitted by the originating peer mobile device 108 may comprise a maximum number of hops or a time-to-live parameter. As the communication message is received at each subsequent mobile device 102, 108, the number of hops may be decremented or the time-to-live parameter may be decremented. When the communication message exceeds the number of hops or time-to-live parameter, the receiving mobile device 108 may discard or drop the communication message.

In some contexts, the mobile device 102 sending communications from one of the peer mobile devices 108 to the base transceiver station 104 and or the network 106 may be referred to as bridging the peer mobile device 108 to the base transceiver station 104 and/or to the network 106. Alternatively or in addition, the mobile device 102 may receive communication from the network 106 via the base transceiver station 104 on behalf of the subject peer mobile 108 and send the message to the subject peer mobile 108 via the peer-to-peer network. The mobile device 102 may transcode the messages that it bridges between the peer-to-peer network and the base transceiver station 104 and/or the network 106. For example, the mobile device 102 may transcode the message from a format suitable to the peer-to-peer network to a format suitable for transmitting to the base transceiver station 104. Likewise, the mobile device 102 may transcode the message from a format suitable to receiving from the base transceiver station 104 to a format suitable for transmitting to the peer-to-peer network.

Mobile devices 102, 108 may route messages in the peer-to-peer network based on a kind of geographical routing. For example, if the second peer mobile device 108b receives a message from the third mobile device 108c for transmitting to the network 106, the second peer mobile device 108b may refer to the geographical map of neighboring mobile devices 102, 108 to determine the mobile device 102, 108 that is on the most direct path to the base transceiver station 104 and route the message on to that next mobile device 102, 108. For example, the second peer mobile device 108b may route the message on to the first peer mobile device 108a; and the first peer mobile device 108a may route the message on to the mobile device 102. In some contexts this may be referred to as geographical routing or location based routing. In an embodiment, the routing of messages in the peer-to-peer network does not rely on a network layer protocol, for example does not rely upon the Internet Protocol (IP) routing and does not rely upon domain name system (DNS) based routing. It will be appreciated by those skilled in the art that the ephemeral relationships between the mobile devices 102, 108 may not comport with the standard network layer protocols, such as IP routing based on DNS.

Figure 2:
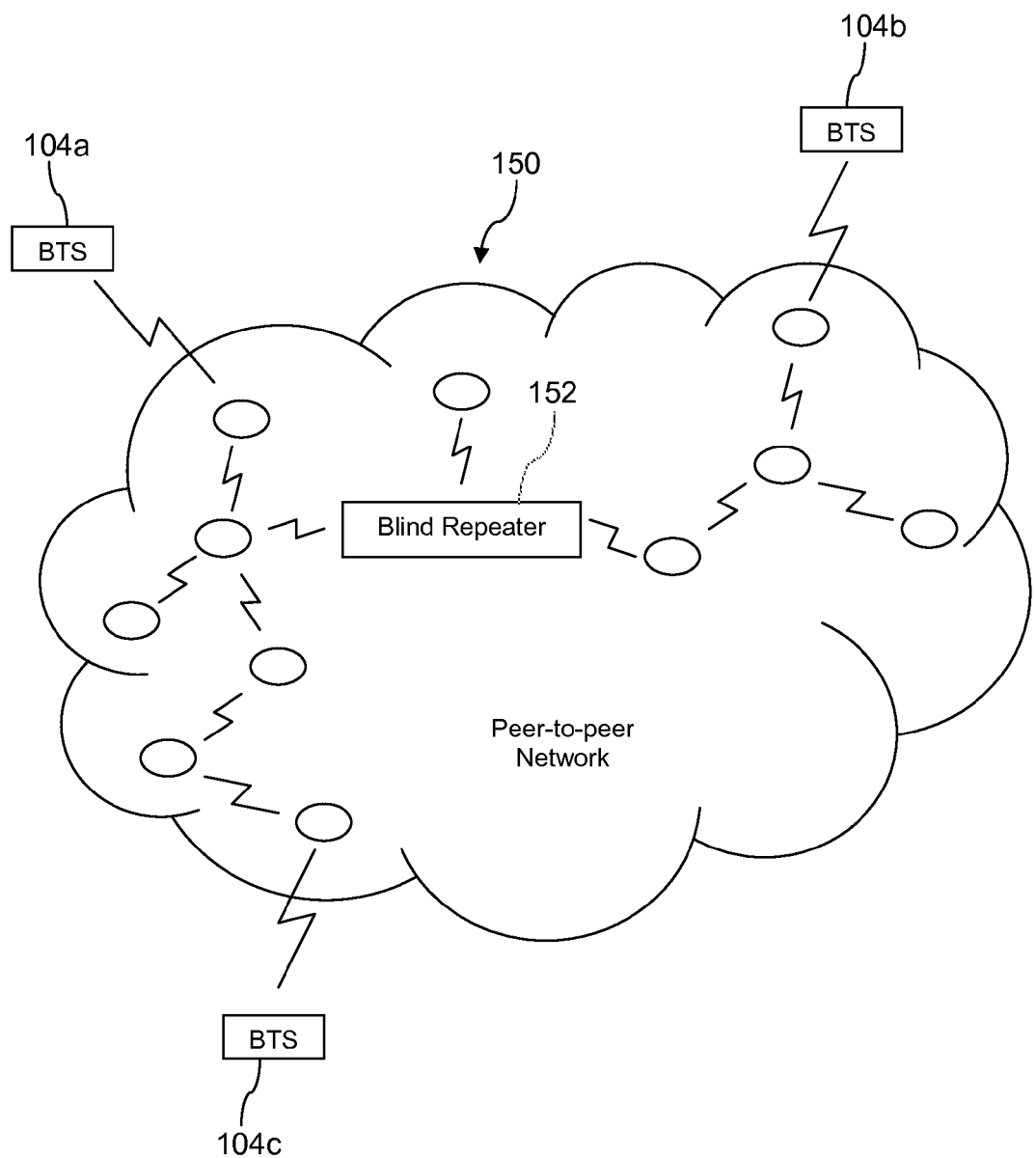
FIG. 2 is a block diagram of another peer-to-peer communication network according to an embodiment of the disclosure.

Turning now to FIG. 2, a peer-to-peer short range radio communication network 150 is described. The ovals within the cloud of the peer-to-peer network 150 comprise mobile devices such as the mobile device 102 and the peer mobile devices 108. The peer-to-peer network 150 couples to the network 106 by a first base transceiver station 104a, a second base transceiver station 104b, and a third base transceiver station 104c. One or more of the mobile devices 102, 108 is in the coverage area of the first base transceiver station 104a, one or more of the mobile devices 102, 108 is in the coverage area of the second base transceiver station 104b, and one or more of the mobile devices 102, 108 is in the coverage area of the third base transceiver station 104c.

In an embodiment, the peer-to-peer network 150 comprises a blind repeater 152. The blind repeater 152 comprises one or more short range radio transceivers and is able to propagate messages from one mobile device 102, 108 to another mobile device 102, 108 in the peer-to-peer network 150. The blind repeater 152 may be a stationary device that is located statically to promote the propagation of communication between mobile devices 102, 108 in the peer-to-peer network 150. As used herein, the term statically located means that the blind repeater 152 may remain in a fixed location for days, weeks, months, or longer. The blind repeater 152 may be attached to a post or pole that is fixed in the ground. By contrast, the mobile devices 102, 108 typically are located close to a user who may relocate, along with his or her mobile device 102, 108, relatively frequently. In an embodiment, the blind repeater 152 does not have a cellular radio transceiver. In an embodiment, any number of blind repeaters 152 may be located between the base transceiver stations 104a, 104b, 104c. In some contexts, the blind repeater 152 may be referred to as a stationary repeater.

The blind repeater 152 may transmit discovery messages at a different rate when no mobile devices 102, 108 are known to be in the peer-to-peer network 150 than when one or more mobile devices 102, 108 are present. For example, when no mobile devices 102, 108 are known to the blind repeater 152, the blind repeater 152 may transmit discovery messages at a lower rate on the assumption that there are few mobile devices 102, 108 in the area, for example because the area is an office park and the time is the early morning hours when most workers are out of the office.

The mobile devices 102, 108 may transmit discovery messages at the same rate all the time. In an embodiment, the mobile devices 102, 108 may transmit discovery messages at least once per minute. Alternatively, the mobile devices 102, 108 may transmit discovery messages at different rates based on a rate of motion of the mobile device 102, 108. For example, if the mobile device 102, 108 is moving relatively fast, the mobile device 102, 108 may transmit discovery messages more frequently because the mobile device 102, 108 may be moving from one peer-to-peer network 150 to a different peer-to-peer network 150 more frequently. Further, when the mobile device 102, 108 is moving relatively more rapidly, the nearest neighboring mobile devices 102, 108 and the mobile devices 102, 108 that the subject mobile device can communicate with via the short range radio transceiver 116 may change more rapidly. In some contexts, the mobile devices 102, 108 may be said to adapt their rate of discovery message transmission and/or broadcast based on a speed of movement of the mobile device 102, 108.

It is understood that the population of mobile devices 102, 108 that form, at least in part, the peer-to-peer network 150 may grow and decrease over time. For example, as users of the mobile devices 102, 108 leave work to go home or leave home to go to work, the constitution of the peer-to-peer network 150 changes. At some times, for example when no mobile devices 102, 108 are present, the peer-to-peer mobile network 150 may be said to be destroyed or to no longer be in existence, even when the blind repeater 152 remains in place. When one or more mobile devices 102, 108 again discover each other, then the peer-to-peer network 150 may be said to again come into existence.

Figure 3:
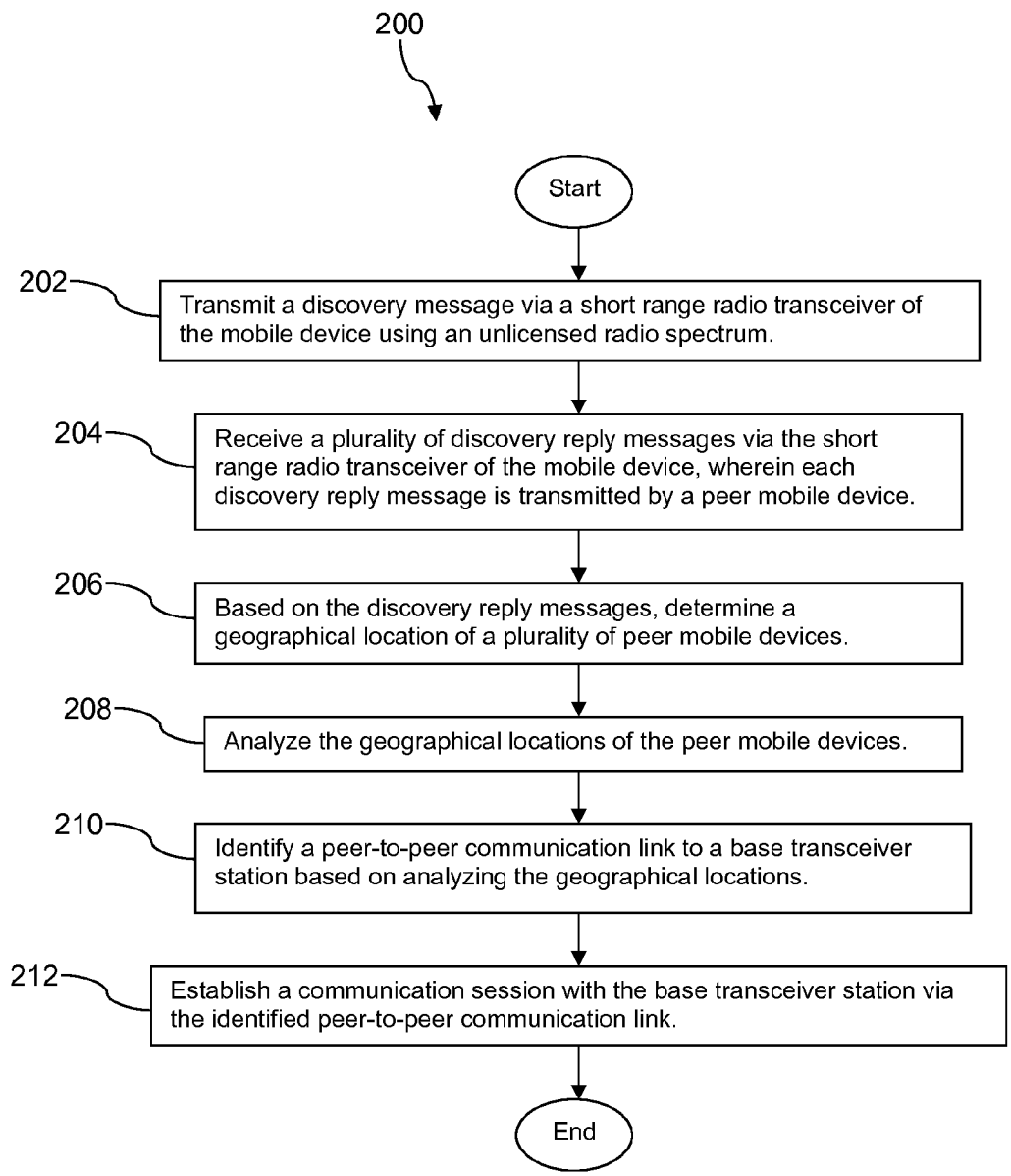
FIG. 3 is a flow chart of a method according to an embodiment of the disclosure.

Turning now to FIG. 3, a method 200 is described. At block 202, a short range radio transceiver of a mobile device transmits a discovery message using an unlicensed radio spectrum. At block 204, a short range radio transceiver of the mobile device receives one or more discovery reply messages, wherein each discovery reply message is transmitted by a peer mobile device. At block 206, the mobile device, for example the peer-to-peer application 118 executing on the processor 112, determines a geographical location of one or more peer mobile devices based on the discovery reply message or messages. At block 208, the geographical location or locations of the peer mobile device or devices are analyzed, for example by the peer-to-peer application 118 executing on the processor 112. At block 210, a base transceiver station is identified, for example by the peer-to-peer application 118 executing on the processor 112, based on analyzing the geographical location or locations.

By analyzing the geographical location or locations of peer mobile devices or other devices and the base transceiver station or base transceiver stations, the peer-to-peer application 118 may construct geographical route lists and store these route lists for later communication activities. A route list may define a sequence of mobile devices 102, 108 to reach a particular base transceiver station 104 coupled to the peer-to-peer network 150. Because of the ephemeral nature of the peer-to-peer network 150, the route lists may be volatile and/or short lived. The analyzing of blocks 208 and 210 may be performed iteratively and the route lists of a mobile device 102, 108 updated accordingly. In an embodiment, the peer mobile devices may transmit ping messages after they have completed an initial discovery process. The ping messages may include an indication of current geographic location. Alternatively, the peer mobile devices may periodically transmit discovery messages. The ping messages and/or repeatedly transmitted discovery messages may be analyzed to update the geographic location of the subject peer mobile devices and to update the route lists. The updating of the route lists may be referred to in some contexts as adapting the route lists. In some contexts, the updating of the route lists may be referred to as promoting self-healing of the peer-to-peer network 150.

At block 212, a communication session is established by the mobile device with the base transceiver station via the identified peer-to-peer communication link. Establishing the communication session may comprise the second peer mobile device 108b establishing a communication session with the first peer mobile device 108a, the first peer mobile device 108a establishing a communication session with the mobile device 102, and the mobile device 102 establishing a communication session with the base transceiver station 104. From the point of view of any one of these mobile devices 102, 108a, 108b, establishing the communication session may comprise establishing its portion of the end-to-end communication path or route. Once the communication session is established, one or messages may be carried over the communication links. For example, the second mobile device 108b may send an email to a device (not shown) coupled to the network 106 and receive emails from an email server (not shown) coupled to the network 106.

It is understood that the method 200 may be practiced by one or more of the mobile devices 102, 108 described above with reference to FIG. 1 and FIG. 2. Additionally, in an embodiment, the method 200 may be practiced by the blind repeater 152.

Figure 4:
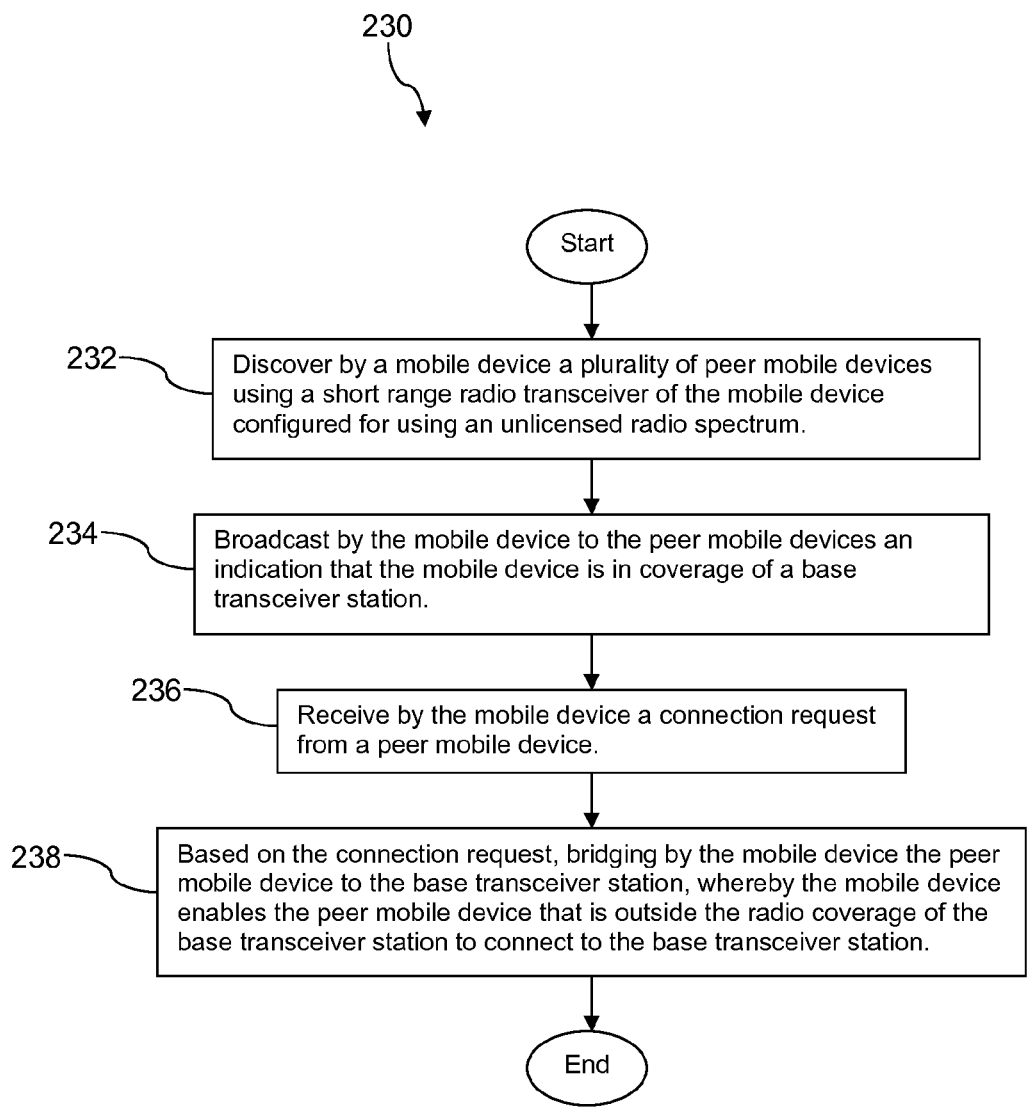
FIG. 4 is a flow chart of another method according to an embodiment of the disclosure.

Turning now to FIG. 4, a method 230 is described. At block 232, a mobile device discovers a plurality of peer mobile devices using a short range radio transceiver of the mobile device configured for using an unlicensed radio spectrum. At block 234, the mobile device broadcasts an indication that the mobile device is in a coverage area of the base transceiver station to the peer mobile devices. At block 236, the mobile device receives a connection request from a peer mobile device. At block 238, based on the connection request, the mobile device bridges the peer mobile device to the base transceiver station, whereby the mobile device enables the peer mobile device that is outside the radio coverage of the base transceiver station to connect to the base transceiver station.

Alternatively, the mobile device may not be in the coverage area of a base transceiver station. The mobile device may discover a blind repeater and a plurality of peer mobile devices using its short range radio transceiver. As described above, the blind repeater may not have a cellular radio transceiver, has one or more short range radio transceivers, and is statically located. When the blind repeater has a plurality of short range radio transceivers it may be capable of engaging in a plurality of communication sessions at the same time, thereby increasing its support of the peer-to-peer network communications throughput. The mobile device may receive a connection request from a peer mobile device that is outside the radio coverage of a base transceiver station. Based on that connection request, the mobile device may send or forward the connection request to the blind repeater, whereby the mobile device enables the peer mobile device that is outside the radio coverage of the base transceiver station to connect to the base transceiver station. If the blind repeater accepts the connection request, the mobile device may establish a connection via the blind repeater.

It is understood that the mobile device may send the connection request and establish the connection through the blind repeater based on a geographical route it has determined based on analyzing geographical locations of discovered peer mobile devices as well as based on the geographical location of the blind repeater. In an embodiment, the geographical location of the blind repeater may be stored in a table of the mobile device. For example, the mobile device may be configured with the geographical locations of a plurality of blind repeaters located within a living region associated with the mobile device. This living region or residence region may be established by storing and analyzing geographic location information over time, for example over a month period of time. Alternatively, the blind repeater may transmit its location during discovery.

Figure 5:
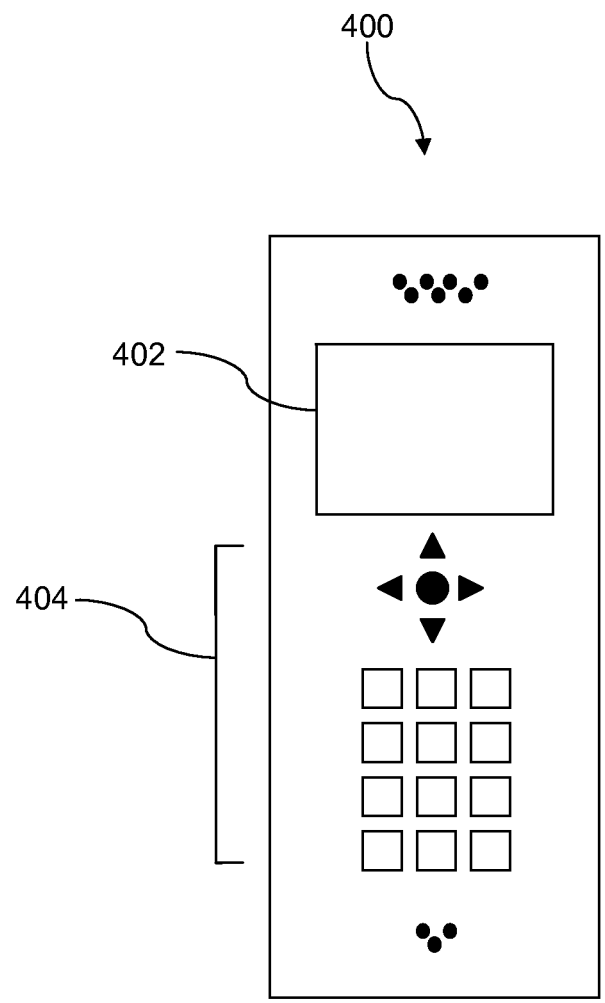
FIG. 5 is an illustration of a mobile device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
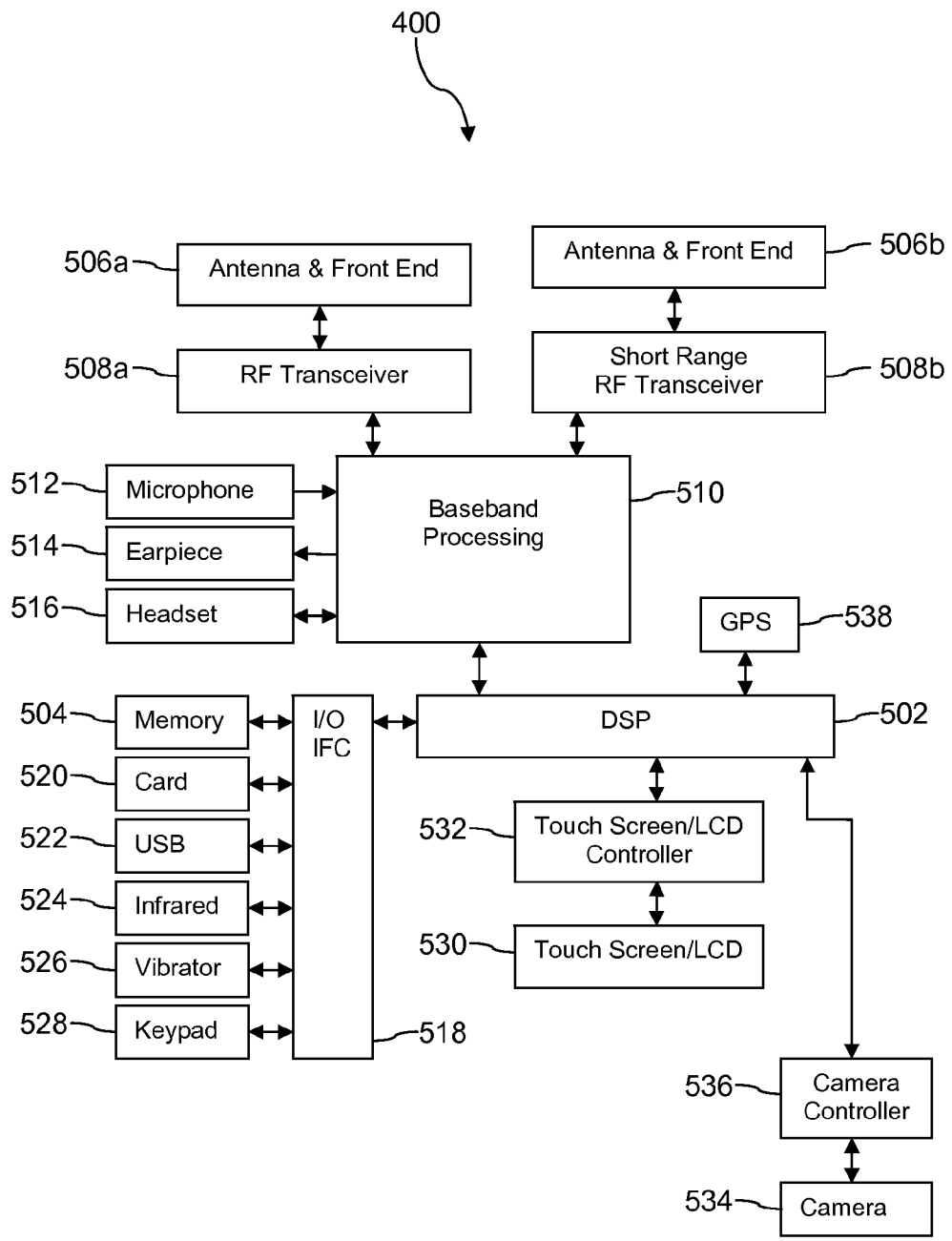
FIG. 6 is a block diagram of a hardware architecture of a mobile device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 comprises a digital signal processor (DSP) 502 and a memory 504. As shown, the mobile device 400 may further comprise a cellular antenna and front end unit 506*a*, a cellular radio frequency (RF) transceiver 508*a*, a short range radio antenna and front end unit 506*b*, and a short range radio transceiver 508*b*. The mobile device 400 may further comprise a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
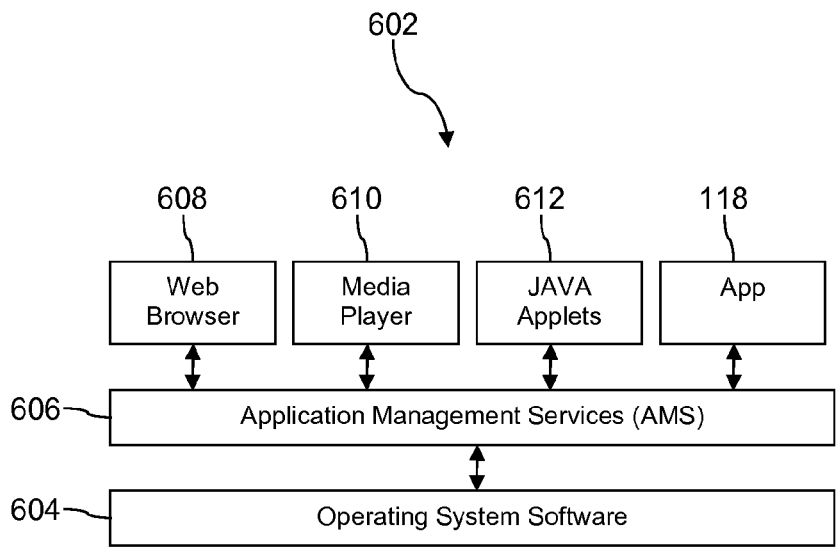
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, JAVA applets 612, and the peer-to-peer communication application 118. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The peer-to-peer communication application 118 is described above.

Figure 7B:
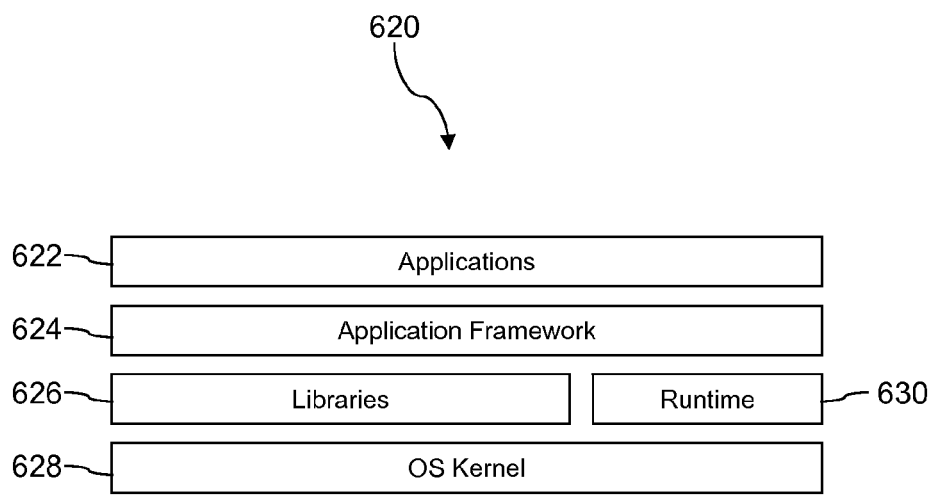
FIG. 7B is a block diagram of another software architecture according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
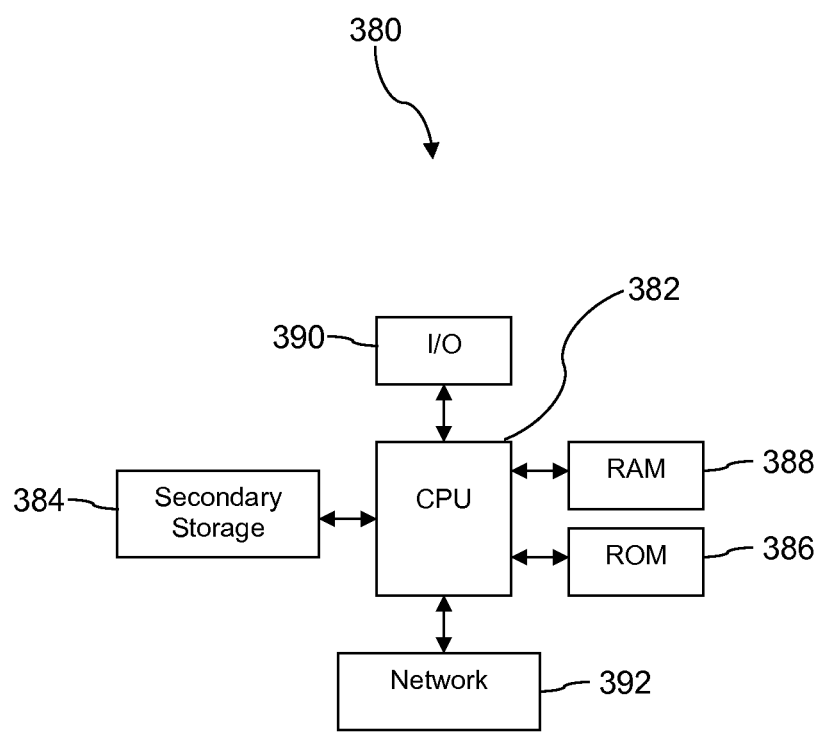
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device for use in a peer-to-peer radio communication network coupled to a cellular radio communication network, comprising:
   a cellular radio transceiver;
   a short range radio transceiver configured for radio communication using unlicensed radio spectrum over distances of at least 5 feet, wherein the short range radio transceiver is not capable of cellular radio communication;
   a non-transitory memory;
   a processor; and
   an application stored in the non-transitory memory that, when executed by the processor,
   discovers at least one of a plurality of peer mobile devices and a plurality of stationary repeaters based on transmitting discovery messages periodically at a rate that depends on a speed of movement of the mobile device using the short range radio transceiver, wherein the plurality of stationary repeaters do not have a wired communication link and do not have a cellular radio transceiver, and wherein the discovery comprises receiving a geographical location of each of the at least one of the plurality of peer mobile devices and the plurality of stationary repeaters,
   identifies a plurality of base transceiver stations to each of which at least one of the discovered peer mobile devices provides a peer-to-peer network link,
   analyzes the geographical locations of the at least one of the plurality of peer mobile devices and the plurality of stationary repeaters,
   based on the analysis of geographical locations of the at least one of the plurality of peer mobile devices and the plurality of stationary repeaters, determines a plurality of geographical route lists, each of the plurality of geographical route lists constitutes the most direct path associated with each of the plurality of the base transceiver stations, and
   initiates a communication session to a first of the plurality of base transceiver stations via a first discovered peer mobile device in the peer-to-peer radio communication network based on the geographical route list associated with the first of the plurality of base transceiver stations, wherein the geographical route list comprises at least one stationary repeater.

2. The mobile device of claim 1, wherein the short range radio transceiver is configured to communicate at a frequency of about 60 GHz.

3. The mobile device of claim 2, wherein the short range radio transceiver is configured to communicate in a frequency range from about 58 GHz to about 62 GHz.

4. The mobile device of claim 1, wherein the short range radio transceiver receives a message from a second discovered peer mobile device in the peer-to-peer radio communication network and the cellular radio transceiver transmits the message to a second base transceiver station of the plurality of base transceiver stations via a connection the cellular radio transceiver has with the second base transceiver station of the plurality of base transceiver stations.

5. The mobile device of claim 1, wherein the short range radio transceiver receives a message from a second discovered peer mobile device in the peer-to-peer radio communication network and the short range radio transceiver transmits the message to the first base transceiver station of the plurality of base transceiver stations via the first discovered peer mobile device.

6. The mobile device of claim 1, wherein the application adapts the plurality of geographical route lists based on ongoing discovery of at least one of peer mobile devices and stationary repeaters and based on ping messages received from already discovered at least one of peer mobile devices and stationary repeaters.

7. A method of peer-to-peer radio communication by a mobile device, comprising:
   transmitting a discovery message via a short range radio transceiver of the mobile device using an unlicensed radio spectrum, wherein the discovery message is transmitted periodically at a rate that depends on a speed of movement of the mobile device;
   receiving a plurality of discovery reply messages via the short range radio transceiver of the mobile device, wherein each discovery reply message is transmitted by a peer mobile device or a stationary repeater, and wherein the stationary repeater does not have a wired communication link and does not have a cellular radio transceiver;
   determining, based on the discovery reply messages, a geographical location of each of at least one of a plurality of peer mobile devices and a plurality of stationary repeaters;
   analyzing the geographical locations of the at least one of the plurality of peer mobile devices and the plurality of stationary repeaters;
   based on analyzing the geographical locations of the at least one of the plurality of peer mobile devices and the stationary repeaters, identifying a peer-to-peer communication link to a base transceiver station, wherein the peer-to-peer communication link constitutes the most direct path to the base transceiver station and comprises at least one stationary repeater; and establishing a communication session with the base transceiver station via the identified peer-to-peer communication link.

8. The method of claim 7, wherein the peer-to-peer communication link comprises at least two mobile devices, wherein the peer-to-peer communication link to the base transceiver station comprises at least one communication link using short range radio and one communication link using cellular radio.

9. The method of claim 8, wherein the at least one communication link using short range radio communicates within the frequency range from about 58 GHz to about 62 GHz.

10. The method of claim 7, wherein at least one of the plurality of discovery reply messages comprises information about a plurality of peer mobile devices.

11. The method of claim 10, wherein the at least one of the plurality of discovery reply messages comprises information about the peer mobile device that sends the discovery reply message and information about other peer mobile devices that the sending mobile device has discovered.

12. A method of peer-to-peer radio communication by a mobile device, comprising:

discovering by the mobile device a plurality of peer mobile devices using a short range radio transceiver of the mobile device configured for using an unlicensed radio spectrum, wherein discovering the plurality of peer mobile devices comprises receiving geographical locations of each of the plurality of peer mobile devices and receiving a geographical location of a base transceiver station from at least one of the plurality of peer mobile devices;

discovering by the mobile device a blind repeater using the short range radio transceiver of the mobile device, wherein the blind repeater does not comprise a cellular radio transceiver and wherein the blind repeater is statically located and a location of the blind repeater is already known or readily determinable;

analyzing the geographical locations of the plurality of peer mobile devices and the blind repeater;

based on analyzing the geographical locations of the plurality of peer mobile devices and the blind repeater, determining a geographical route list that includes the blind repeater between the mobile device and the base transceiver station;

receiving by the mobile device a connection request from a peer mobile device that is outside the radio coverage of the base transceiver station;

initiating a communication session to the blind repeater based on the received connection request and based on the geographical route list; and sending the connection request to the blind repeater, whereby the mobile device enables the peer mobile device that is outside the radio coverage of the base transceiver station to connect to the base transceiver station.

13. The method of claim 12, further comprising sending a short message service (SMS) message to the blind repeater.

14. The method of claim 12, further comprising sending an electronic mail (email) message to the blind repeater.

\* \* \* \* \*